United States Patent [19]

Murray

[11] 4,388,440
[45] Jun. 14, 1983

[54] POLYESTER RESIN BLEND

[75] Inventor: James G. Murray, East Brunswick, N.J.

[73] Assignee: Mobil Oil Corporation, New York, N.Y.

[21] Appl. No.: 175,553

[22] Filed: Aug. 5, 1980

Related U.S. Application Data

[63] Continuation of Ser. No. 27,171, Apr. 4, 1979, which is a continuation-in-part of Ser. No. 870,780, Jan. 19, 1978, abandoned.

[51] Int. Cl.$^3$ .............................................. C08L 67/06
[52] U.S. Cl. .................................................... 525/49
[58] Field of Search ........................................ 525/49

[56] References Cited

U.S. PATENT DOCUMENTS 3,560,445  2/1971  Fekete ................................. 260/861
3,631,224  12/1971 Baum .................................. 260/861

FOREIGN PATENT DOCUMENTS 1393514  5/1975  United Kingdom .

OTHER PUBLICATIONS

Leitmann, Zhur Priklad Khim, vol. 34, No. 8, pp. 1868-1874, Aug. 1961, (translation).

Primary Examiner—Paul R. Michl
Attorney, Agent, or Firm—Charles A. Huggett; Michael G. Gilman; Edward J. Trojnar

[57] ABSTRACT

A blend, useful as a molding composition, of an unsaturated polyester with a mixture of isomeric methyl ethenyl benzenes containing a high proportion of the para-isomer.

4 Claims, No Drawings

POLYESTER RESIN BLEND

CROSS REFERENCE TO RELATED APPLICATION

This is a continuation of copending application Ser. No. 027,171, filed Apr. 4, 1979, which is a continuation-in-part of Application Ser. No. 870,780, filed Jan. 19, 1978, abandoned.

Other related applications are Ser. No. 706,981, filed July 19, 1976, now U.S. Pat. No. 4,086,287, Ser. No. 801,177, filed May 27, 1977 now abandoned, and Ser. No. 925,585, filed July 17, 1978.

This invention relates to blends of polyesters with styrenic cross-linking monomers useful as molding compositions and for other purposes.

The Prior Art

Molding compositions based on blends of unsaturated polyesters with cross-linking monomers are known and are widely used for many purposes. The compositions may be formulated to have a wide range of physical properties: they may be brittle and hard, tough and resilient or soft and flexible, depending upon the materials used in the formulation. A number of different techniques may be used in the fabrication of articles from these resins including mold casting, bag molding, die molding, injection molding, lay-up, spray-up encapsulation and filament winding.

The polyesters which are used in these compositions are unsaturated, the degree of unsaturation being controlled by the choice of materials used to make the polyester. Polyesters derived from unsaturated acids and glycols are common in commerce.

The polyester is blended with a cross-linking monomer, usually a styrenic monomer such as styrene, alpha-methyl styrene, or the material known as "vinyl toluene", which is a mixture consisting mainly of meta- and para-methyl styrenes (vinyl toluenes) produced by the catalytic dehydrogenation of a mixture of the corresponding m- and p-ethyltoluenes. The ethyltoluene mixture is itself obtained by the fractional distillation of a mixture of the o-, m- and p-ethyltoluenes. The ratio of the m- and p-isomers in the monomer mixture is approximately 65:35 (m:p). A convenient summary of the preparation and properties of the monomer mixture and of polymers produced from it is given in "Styrene: Its Polymers, Copolymers and Derivatives" Ed. R. H. Boundy, R. F. Boyer, ACS Monograph Series, 1952, Hafner Publishing Company, pages 1232 to 1245.

The Invention

I have now found that improved polyester blends can be made by using, as the cross-linking monomer, a mixture of isomeric methyl ethenyl benzenes which contains a high proportion of the para-isomer and extremely small quantities, if any, of the ortho-isomer. Products produced from these blends are characterized by improved tensile properties and other physical characteristics.

The cross-linking monomer consists essentially of the m- and p-isomers of methyl ethenyl benzene. The mixture is substantially devoid of the o-isomer; when the o-isomer is present, the amount of it is less than 0.1% based on the total weight of the isomer mixture.

The ratio of the isomers in the mixture is as follows:

| Isomer | Wt. Percent |
|---|---|
| 1-methyl-2-ethenyl benzene | Less than 0.1, preferably less than 0.05. |
| 1-methyl-3-ethenyl benzene | Less than 10, preferably less than 5. |
| 1-methyl-4-ethenyl benzene | 90–99 preferably at least 95. |

Generally, the proportion of the p-isomer (1-methyl-4-ethenyl benzene) will be at least 95 weight percent with the m-isomer (1-methyl-3-ethenyl benzene) constituting less than 5 weight percent of the mixture. Particularly preferred mixtures contain 97 to 99 weight percent of the p-isomer and 1 to 3 weight percent of the m-isomer.

The isomer mixture may contain impurities and adventitious materials in addition to the methyl ethenyl benzenes. Generally, these other materials will not constitute more than 1 percent by weight of the total mixture. These other materials derive essentially from the process used to make the methyl ethenyl benzenes.

A typical isomer mixture has the following analysis, by weight, determined by gas chromatography:

|  |  | Wt. Percent |
|---|---|---|
| Total vinyl benzenes |  | 99.41 |
| Residue: |  |  |
| Ethyl toluene | 0.10 |  |
| Mesitylenes etc. | 0.15 |  |
| Non-vinylic higher boilers | 0.34 | 0.59 |
|  | 0.59 | 100.00 |
| Vinyl benzenes: |  |  |
| 1-methyl-2-ethenyl benzene |  | 0.05 |
| 1-methyl-3-ethenyl benzene |  | 2.6 |
| 1-methyl-4-ethenyl benzene |  | 97.4 |

The mixture of the isomeric methyl ethenyl benzenes may be obtained by the catalytic dehydrogenation of a mixture of the corresponding ethyl toluenes, which in turn may be obtained by the selective alkylation process disclosed and claimed in co-pending U.S. Pat. Application Ser. Nos. 709,981, filed July 19, 1976, (now U.S. Pat. No. 4,086,287) Ser. No. 801,177, filed May 27, 1977 (now abandoned) and Ser. No. 925,585, filed July 17, 1978 by Warren W. Kaeding and Lewis B. Young, the disclosures of which are incorporated herein by reference.

In its application to the production of the methyl ethenyl benzenes, the method disclosed in the Kaeding et al applications essentially involves the alkylation of toluene with ethylene in the presence of certain crystalline aluminosilicate zeolite catalysts. The catalyst has a silica to alumina ratio of at least 12 and a constraint index (defined in the applicatin) within the range of 1 to 12. The process produces an extremely high proportion of the 1-methyl-4-ethyl benzene isomer, with only a minor proportion of the 1-methyl-3-ethyl benzene isomer and negligible amounts of the 1-methyl-2-ethyl benzene isomer. The almost complete absence of the 1-methyl-2-ethyl isomer is highly advantageous because this isomer tends to produce undesired by-products during the dehydrogenation step (indanes and indenes which adversely affect the properties of the resultant polymers and which cannot be easily separated from the methyl ethenyl benzenes). Suitable dehydrogenation methods are well known in the art; those used for the conversion of ethylbenzene to styrene or in the preparation of vinyl toluene are, in general, suitable.

The mixture of isomeric methyl ethyl benzenes may be subjected to distillation prior to the dehydrogenation step in order to separate out various by-products and after the de-hydrogenation has been completed, a further distillation may be carried out to separate the methyl ethenyl benzenes from their saturated precursors.

The unsaturated polyester which is blended with the cross-linking monomer is typically the condensation product of an unsaturated dibasic acid and a glycol. Usually a saturated dibasic acid is employed with the unsaturated acid to modify the degree of unsaturation and, thereby, the reactivity of the resulting resin. The unsaturated acid component is commonly maleic anhydride or fumaric acid; the saturated component is usually phthalic anhydride, iso-phthalic acid, adipic acid or terephthalic acid. Because linear materials are desired, the alcohol component of the polyester will normally be dihydric e.g. ethylene glycol, propylene glycol, diethylene glycol, dipropylene glycol, butane-1,4-diol or an alkylene oxide such as ethylene oxide or propylene oxide. Fire retardancy can be achieved by the use of halogenated derivatives such as tetrabromo phthalic anhydride, chlorendic anhydride, tetrachlorophthalic anhydride or dibromoneopentyl glycol. The products obtained from these materials may be self-extinguishing or non-flammable. Chemical resistance may be conferred by the use of neopentyl glycol, isophthalic acid, bisphenol A and trimethylpentandiol. Weathering resistance may be enhanced by the use of neopentyl glycol and methyl methacrylate.

The choice of polyester will depend upon the properties required in the final product and the characteristics of the uncured composition. The polyesters are generally, liquid, semi-liquid, solid or semi-solid materials which can be readily dissolved in the monomer mixture on heating. The viscosity of the blend may be varied by suitable choice of polyester or the proportion of polyester in the blend. Polyesters are commonly available in liquid or semi-liquid molding, lay-up or spray-up types as well as the more solid types. The blend will, of course, be formulated according to the desired use, e.g. bulk molding, sheet molding, lay-up, spray-up, filament winding, encapsulation or any of the other known techniques.

The monomer mixture is particularly suitable for use as a reactive diluent for thermosetting polyester resins. When mixed with polyesters the monomer mixture produces a resin mix of lower viscosity than vinyltoluene (when used at the same concentration). The cure reaction, on the other hand, is less exothermic than that of vinyl toluene being more comparable to that of styrene. At the same time, however, the mixture has a higher boiling point and lower vapor pressure than styrene. It therefore has the advantages both of styrene (slower polymerization rate, less exotherm) and of vinyl toluene (higher boiling point, lower vapor pressure).

The relative amounts of the cross-linking monomer and the polyester will normally be in the range of 10 to 50 percent mixture, preferably 30 to 40 of the mixture, by weight. Cure conditions and catalysts for the resin blends will be comparable to those for polyester/styrene blends. Thus, peroxide catalysts will normally be used, optionally with an amine or metallic ion co-catalyst such as N,N-dimethyl-aniline or cobalt octoate. Benzoyl peroxide is a convenient peroxy curing catalyst. Other suitable catalysts will be known to those skilled in the art. Metallic soaps, tertiary amines or both may be added to act as catalyst activators; the combination of methyl ethyl ketone and cobalt octoate or benzoyl peroxide and diethyl aniline is commonly employed.

Other materials may be added to the blends in order to obtain the desired properties in the final product or to facilitate working, for example, thixotropic agents such as pyrogenic silica to prevent resin run-off, paraffin wax to minimize cure inhibition on exposed surfaces, UV absorbers, extenders, fibrous reinforcements e.g. glass fiber, asbestos, sisal or PVA fiber. Inhibitors may be added to retard cross-linking until desired.

The following Examples are given by way of illustration.

EXAMPLES 1-6

Polyester resin blends were made from a number of commercially available unsaturated polyesters. The polyesters used are set out in Table 1 below.

TABLE 1

POLYESTER RESINS EVALUATED

| PRODUCER | DESIGNATION | POLYESTER TYPE |
|---|---|---|
| Grace | GR 941 base resin | General purpose low-viscosity, non-promoted, unsaturated resin |
| Grace | GR 665 base resin | Unsaturated resin for flexible products |
| Reichold | 33-031 | Unsaturated, low viscosity, low reactivity thixotropic promoter for rigid products |
| Koppers | 1000-25 | General purpose, low reactivity, medium viscosity, unsaturated resin |
| Koppers | 6000-25 | Isophthalic, unsaturated, high reactivity resin (high degree of unsaturation) |

Samples of these polyester resins were distilled to remove any styrene monomer present using a low enough temperature to prevent polymerization. Distillation was carried out on a steam bath using a rotary evaporator at a pressure of 1 mm. Hg. or less. Heating was continued until the samples attained a constant weight. When the resins were then reconstituted to their original styrene monomer concentration, the measurement of a viscosity close to the original viscosity confirmed that no condensation or cure reactions had taken place during the removal of the monomer.

The polyesters were then formulated with (i) styrene, (ii) vinyl toluene (approximately 60% m-methylstyrene, 40% p-methylstyrene) and (iii) a monomer mixture having the following composition (weight percent):

| | |
|---|---|
| Methyl ethenyl benzenes | 99.43 |
| Ethyl toluene | 0.53 |
| Xylenes, cumenes, mesitylenes | 0.01 |
| High boiling materials | 0.03 |
| Methyl ethenyl benzenes: | |
| 1-methyl-2-ethenyl benzene | — (1) |
| 1-methyl-3-ethenyl benzene | 3.0 |
| 1-methyl-4-ethenyl benzene | 97.0 |

Note:
(1) Less than 0.05%.

The viscosities of the blends are shown in Table 2 below.

TABLE 2

| Example No. | POLYESTER Resin | MONOMER Type | % Conc. | Viscosity 30° C. Cp. × Density |
|---|---|---|---|---|
| 1-A | GR 665 | Styrene | 40.0 | 223 |
| 1-B | GR 665 | MEB | 40.0 | 350 |
| 1-C | GR 665 | VT | 40.0 | 420 |
| 2-A | GR 941 | Styrene | 40.0 | 243 |
| 2-B | GR 941 | MEB | 40.0 | 418 |
| 2-C | GR 941 | VT | 40.0 | 400 |
| 3-A | GR 511 | Styrene | 40.0 | 124 |
| 3-B | GR 511 | MEB | 40.0 | 149 |
| 3-C | GR 511 | VT | 40.0 | 154 |
| 4-A | Koppers 1000-25 | Styrene | 26.5 | 1450 |
| 4-B | Koppers 1000-25 | Styrene | 40.0 | 162 |
| 4-C | Koppers 1000-25 | MEB | 26.5 | 3390 |
| 4-D | Koppers 1000-25 | MEB | 40.0 | 215 |
| 4-E | Koppers 1000-25 | VT | 26.5 | 3640 |
| 4-F | Koppers 1000-25 | VT | 40.0 | 293 |
| 5-A | Koppers 6000-25 | Styrene | 31.2 | 2570 |
| 5-B | Koppers 6000-25 | Styrene | 40.0 | 485 |
| 5-C | Koppers 6000-25 | PMS | 31.2 | 3650 |
| 5-D | Koppers 6000-25 | PMS | 40.0 | 680 |
| 5-E | Koppers 6000-25 | VT | 31.2 | 4620 |
| 5-F | Koppers 6000-25 | VT | 40.0 | 745 |
| 6-A | Reichold 33-031 | Styrene | 40.0 | 145 |
| 6-B | Reichold 33-031 | PMS | 40.0 | 212 |
| 6-C | Reichold 33-031 | VT | 40.0 | 227 |

The results in Table 2 show that the mixes with the methyl ethenyl benzene (MEB) mixture according to the present invention generally have a lower viscosity (at the same concentration) than the mixes with vinyl toluene. This facilitates handling and use of the mixes.

Samples of two resin systems containing styrene, vinyl-toluene, and MEB were then cured as thin films under identical conditions and the modulus properties of these films measured as a function of temperature using the Rheovibron thermometcanical analyzer.

The resins were prepared and cured in the following manner:

Samples of resin containing 40% of styrene and equal weights and equal molar amounts (40% and 43%) of vinyltoluene and MEB were prepared. These samples were then treated with 4% Lupersol 224 (4% active oxygen) and 0.5% of a 3% solution of cobalt octoate and press-cured as a thin film at 60° for 30 minutes followed by an oven post cure at 110° C. for an additional 30 minutes.

Samples were then cut from these films for Rheovibron analysis. Modulus temperature characteristics of these films were measured from 25° C. to 130° C. and the glass transition temperature obtained from the maximum in the loss modulus cure. The modulus values at 25° C. and 100° C. and the observed glass transition temperature are listed in Table 3. Surprisingly, it can be seen that the values of glass transition and 100° C. modulus for the MEB mixes or similar to those obtained for styrene while the values obtained for vinyltoluene are considerably different with glass transition temperatures being lower in one resin and higher in the other.

TABLE 3

| Monomer % | | Modulus (dynes/cm² × 10⁻⁹) 25° C. | 100° C. | Tg° |
|---|---|---|---|---|
| TABLE 3A - GR 665 Polyester | | | | |
| Styrene | 40 | 27.5 | 2.6 | 81 |
| Vinyltoluene | 40 | 32.3 | 13.5 | 102 |
| MEB | 40 | 29.4 | 3.4 | 79 |
| TABLE 3B - GR 941 Polyester | | | | |
| Styrene | 40 | 25 | 16.7 | 120 |
| Vinyltoluene | 43 | 24 | 10.6 | 107 |

TABLE 3-continued

| Monomer % | | Modulus (dynes/cm² × 10⁻⁹) 25° C. | 100° C. | Tg° |
|---|---|---|---|---|
| MEB | 43 | 27.3 | 11.7 | 116 |
| MEB | 40 | 26.8 | 14.4 | 118 |

EXAMPLES 7-13

Further experiments were carried out using four of the commercially available unsaturated polyesters described above, GR 941, GR 665, Koppers 1000-25 and Koppers 6000-25.

These resins were freed of any styrene by distillation as described in Examples 1-6. They were then mixed with styrene, vinyl toluene (mixture mainly of meta- and para-methyl styrenes, meta:para ratio about 65:35) and para-methyl styrene (97% by weight para methyl styrene, less than 0.1% by weight ortho methyl styrene) to form molding compositions with a catalyst system comprising 1.25% Lupersol 224 (3,5-dimethyl-3,5-dihydroxy-1,2-peroxycyclopentane, 4% active oxygen) and 0.2% of 3% cobalt octoate solution. The compositions were cast into silicone rubber tensile bar molds and cured overnight at room temperature followed by 30 minutes post-cure at 110° C. The tensile properties of the cured compositions were then evaluated; the results are given in Table 4 below. The amount of the monomer was 40% unless otherwise indicated.

TABLE 4

Tensile Properties of Cast Polyester Resins

| Example No. | Resin | Monomer | Tensile Break psi | Tangent Modulus psi |
|---|---|---|---|---|
| 7-A | GR 665 | Styrene | 1310 | 235,000 |
| 7-B | GR 665 | PMS | 1280 | 256,000 |
| 7-C | GR 665 | Vinyltoluene | 1510 | 247,000 |
| 8-A | GR 665 | Styrene* | 1600 | 307,000 |
| 8-B | GR 665 | PMS* | 1940 | 265,000 |
| 8-C | GR 665 | Vinyltoluene* | 1390 | 306,000 |
| 9-A | GR 941 | Styrene | 1390 | 306,000 |
| 9-B | GR 941 | PMS | 1640 | 361,000 |
| 9-C | GR 941 | Vinyltoluene | 1580 | 370,000 |
| 10-A | 1000-25 | Styrene (26.5%) | 700 | 258,000 |
| 10-B | 1000-25 | PMS (26.5%) | 890 | 252,000 |
| 10-C | 1000-25 | Vinyltoluene (26.5%) | 1130 | 263,000 |
| 11-A | 1000-25 | Styrene | 1200 | 284,000 |
| 11-B | 1000-25 | PMS | 2300 | 261,000 |
| 11-C | 1000-25 | Vinyltoluene | 1070 | 249,000 |
| 12-A | 6000-25 | Styrene (31.2%) | 1440 | 242,000 |
| 12-B | 6000-25 | PMS (31.2%) | 2900 | 264,000 |
| 12-C | 6000-25 | Vinyltoluene (31.2%) | 2080 | 257,000 |
| 13-A | 6000-25 | Styrene | 1970 | 263,000 |
| 13-B | 6000-25 | PMS | 2650 | 235,000 |
| 13-C | 6000-25 | Vinyltoluene | 2200 | 243,000 |

Note:
*Polyester/monomer mixture prepared and stored prior to pouring.

I claim:
1. A resin composition which comprises an unsaturated polyester and a polymerizable mixture of isomers of methyl ethenyl benzene consisting essentially of 1-methyl-2-ethenyl benzene, 1-methyl-3-ethenyl benzene, and 1-methyl-4-ethenyl benzene, in the following proportions by weight:

1-methyl-2-ethenyl benzene 0 to 0.1%
1-methyl-3-ethenyl benzene 1 to 10%
1-methyl-4-ethenyl benzene at least 90%;
said composition having a lower viscosity and a lower exotherm upon curing than the corresponding compositions in which said isomers comprise methyl ethenyl benzene containing 60% or more of the meta isomer and 40% or less of the para isomer.

2. The composition of claim 1 in which the isomers are present in the mixture in the following proportions by weight:
   1-methyl-2-ethenyl benzene 0 to 0.05%
   1-methyl-3-ethenyl benzene 1 to 5%
   1-methyl-4-ethenyl benzene at least 95%.

3. The composition of claim 1 in which the isomers are present in the mixture in the following proportions by weight:
   1-methyl-2-ethenyl benzene 0 to 0.05%
   1-methyl-3-ethenyl benzene 1 to 3%.
   1-methyl-4-ethenyl benzene at least 97%.

4. A composition according to claim 1 in which the polyester is derived from a dihydric alcohol and a unsaturated dibasic carboxylic acid or its anhydride.

* * * * *